United States Patent [19]

Matsuda et al.

[11] Patent Number: 4,666,015

[45] Date of Patent: May 19, 1987

[54] POWER TRAIN FOR FRONT AND REAR WHEEL DRIVE VEHICLE

[75] Inventors: Minoru Matsuda, Tokyo; Takashi Shinozaki, Saitama, both of Japan

[73] Assignee: Honda Giken Kogyo Kabushiki Kaisha, Tokyo, Japan

[21] Appl. No.: 565,351

[22] Filed: Dec. 27, 1983

[30] Foreign Application Priority Data

Dec. 28, 1982 [JP] Japan .................. 57-232857

[51] Int. Cl.[4] ............ B60K 17/34; B62K 11/04; B62K 19/06

[52] U.S. Cl. .................. 180/233; 74/606 R; 74/665 GE; 123/195 A; 180/72; 180/227; 280/281 R; 280/283; 280/724; 280/798; 474/86

[58] Field of Search ........... 180/233, 230, 231, 241, 180/251, 219, 227, 228, 205, 206, 207, 215, 56, 72; 74/606 R, 665 F, 665 G, 665 GA, 665 GE; 474/86, 146; 280/281 R, 281 B, 282, 663, 796, 798

[56] References Cited

U.S. PATENT DOCUMENTS

| | | | |
|---|---|---|---|
| 566,400 | 8/1896 | Johnson | 474/86 |
| 1,011,664 | 12/1911 | Sundh | 180/72 UX |
| 1,369,923 | 3/1921 | Heinze | 180/21 |
| 2,316,477 | 4/1943 | Weaver | 180/226 |
| 3,642,083 | 2/1972 | Rodler, Jr. | 180/227 X |
| 3,746,113 | 7/1973 | Tidwell | 180/227 X |
| 4,223,567 | 9/1980 | Onda | 74/606 R |

FOREIGN PATENT DOCUMENTS 1002 of 1900 United Kingdom ............... 180/233

Primary Examiner—John J. Love
Assistant Examiner—Mitchell J. Hill
Attorney, Agent, or Firm—Lyon & Lyon

[57] ABSTRACT

A front and rear wheel drive vehicle having straddle-type seating. A power train is located beneath the seat and between the footpegs of the vehicle. The engine employs parallel output shafts located on either side of the crankshaft to drive power transmission means to the front and rear axles. A speed change mechanism is contained within the engine case along with the output shafts and includes a first transmission shaft between the crankshaft and one of the output shafts. In one embodiment, the cylinder block of the engine is illustrated as being inclined toward the speed change transmission such that the cylinder block, cylinder head and head cover do not extend laterally outwardly beyond the engine case. To employ both output shafts, sprockets are arranged on each shaft with a coupling chain. The orientation of the output shafts provides for a narrower engine profile.

10 Claims, 17 Drawing Figures

POWER TRAIN FOR FRONT AND REAR WHEEL DRIVE VEHICLE

BACKGROUND OF THE INVENTION

The field of the present invention is power systems for small vehicles.

Small vehicles straddled by a rider and having three or four wheels particularly adapted for over-land use have found popularity. The configuration of such vehicles has typically included a frame with an engine located within the frame, often under the seat. The rider straddles the vehicle with his feet on footpegs extending laterally from the frame. A steering handlebar controls the direction of the vehicle.

With such over-land vehicles, drive of all wheels is often desired. However, the design of the drive system for driving all wheels faces certain complications when applied to a straddle-ridden vehicle. One major difficulty is the achievement of proper power train compactness. The lateral dimension of the vehicle where straddled by the rider is limited by the size of the rider. The footpegs cannot be so placed that the rider position becomes awkward. The ability of the rider to control the stability of the vehicle in part by his own weight requires that the footpegs be properly located. As a result, the power train located generally beneath the rider and between the footpegs cannot be excessively wide.

For purposes of vehicle clearance, unencumbered steering and reduced overall length, the longitudinal size of the engine is advantageously kept to a minimum. Naturally, mechanical simplicity is also advantageous.

Two systems previously devised employing all-wheel drive are disclosed in Japanese Pat. Nos. 44-4694 (1969) and 49-6923 (1974). In the former, a shaft drive for the front wheels is connected to an output shaft providing power to the rear wheels. In the latter, a chain drive for the front wheels is connected to the rear wheel output shaft as well. Such systems require the output shaft to be located to the side of the crankcase and in such a location as to have a direct line to both the front and rear axles. Consequently, the engine width becomes excessive. As a result, space is restricted and the footpegs may be inappropriately placed. The same difficulty is naturally applicable to all-wheel drives on both motor tricycles and four-wheel vehicles.

SUMMARY OF THE INVENTION

The present invention is directed to a power train configuration which is appropriately compact for employment in straddle-type all-wheel drive vehicles and yet is mechanically uncomplicated. To this end, two output shafts are employed which are located on either side of the crankshaft and parallel thereto. For chain-driven vehicles, the parallel output shafts allow the driving sprocket to be located inwardly of the furthest laterally extending component of the engine case. In this way, a straight line to the driven sprocket is achieved to both front and rear wheels without interference from other laterally extending components. With shaft-driven vehicles, an output shaft is convenientlly provided directly toward the drive axle without undue component length and optionally with similar drive train components.

In a further aspect of the present invention, the cylinder block extends from the engine case and is inclined toward the more extended portion of the case. As a result, the cylinder block and head assembly do not extend laterally beyond the lateral extent of the engine case. Necessarily, the lateral dimensions of the overall power train are thereby reduced. The inclination of the cylinder block also reduces the overall height of the engine.

By achieving the foregoing, a more compact power train is achieved providing more room for the advantageous placement of footpegs, suspension and steering mechanisms and accessory equipment. The center of gravity of the heaviest assembly, the engine and engine case, is more easily located in an advantageous position. The employment of parallel shafts reduces the necessary gear complexity to accommodate counterrotation and extended drive train length.

Accordingly, it is a principle object of the present invention to provide an improved power train for a straddletype vehicle having both front and rear wheel drives. Other and further objects and advantages will appear hereinafter.

DETAILED DESCRIPTION OF THE PREFERRED EMBODIMENTS

Figure 1:
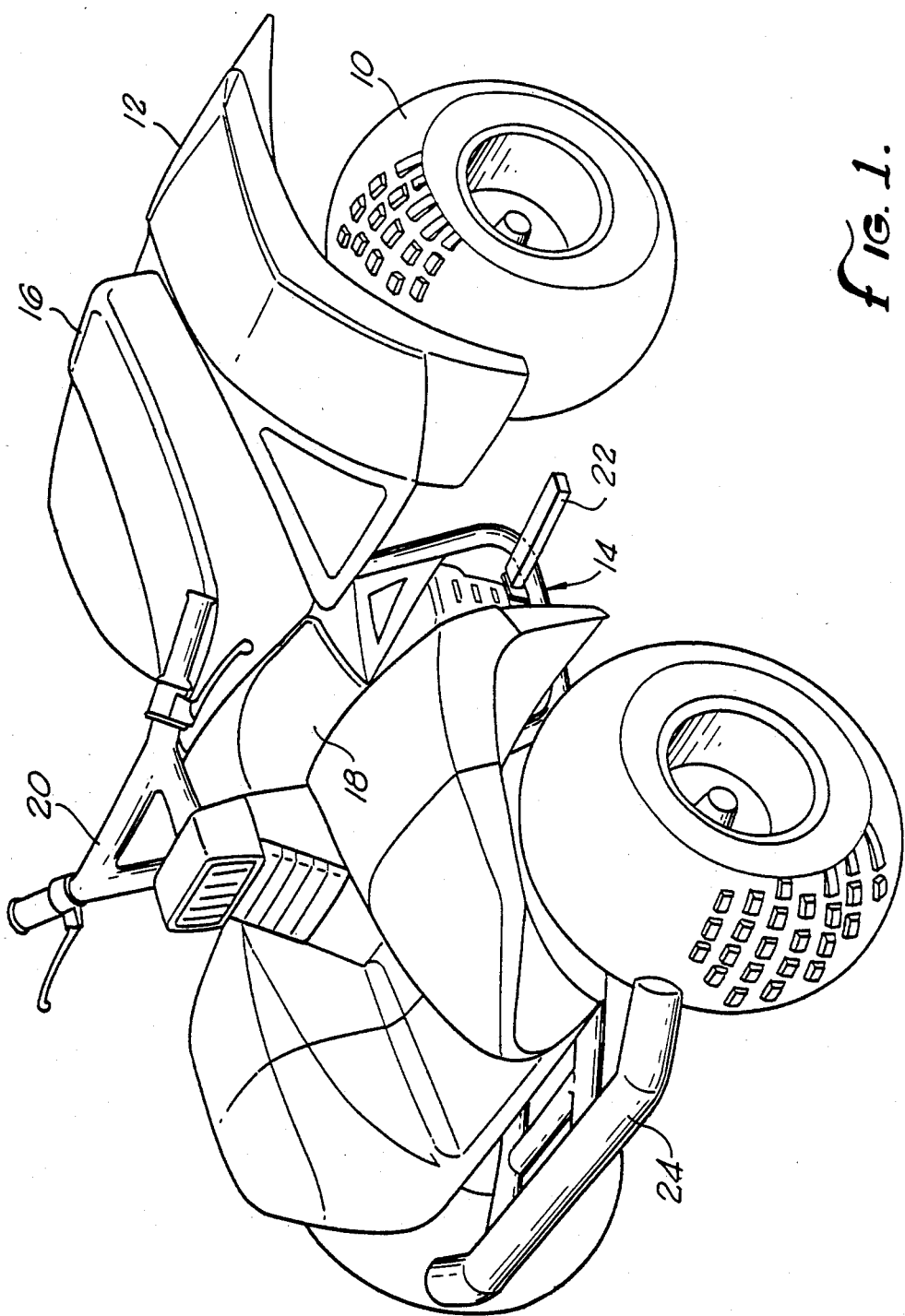
FIG. 1 is an oblique view of a four wheel straddleridden vehicle contemplated for use with the present invention.

Turning in detail to the drawings, a four wheel vehicle is illustrated in FIG. 1 as including four high flotation tires 10, a body 12 and a frame 14. Positioned centrally on the vehicle is a seat 16 and a fuel tank 18. The vehicle is shown to have a handlebar-type steering mechanism 20. Footpegs 22 extend laterally from either side of the vehicle and are fixed to the frame 14. A bumper 24 extends forwardly of the front tires 10.

Figure 2:
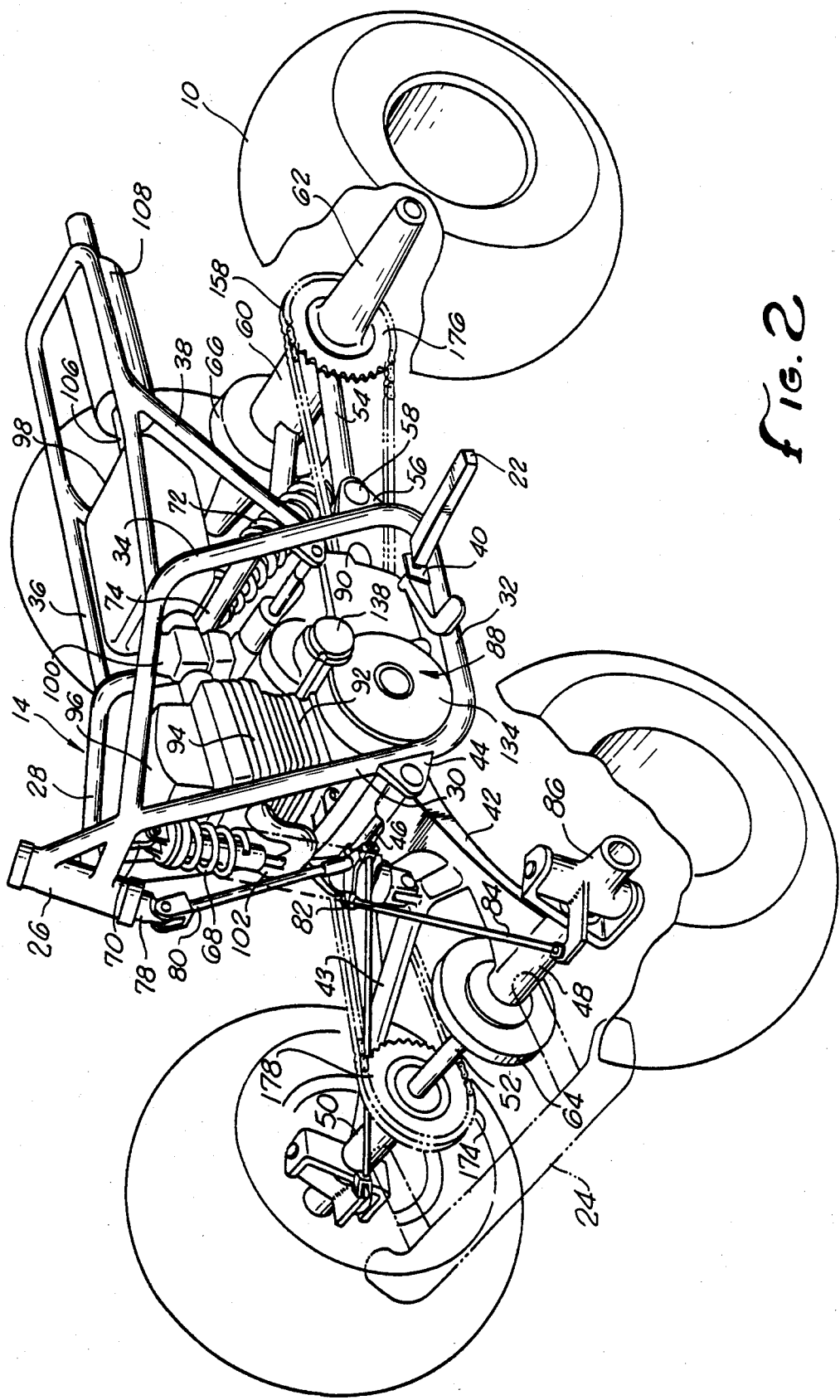
FIG. 2 is an oblique view of a first embodiment of the present invention with the body of the vehicle removed for clarity.
Figure 3:
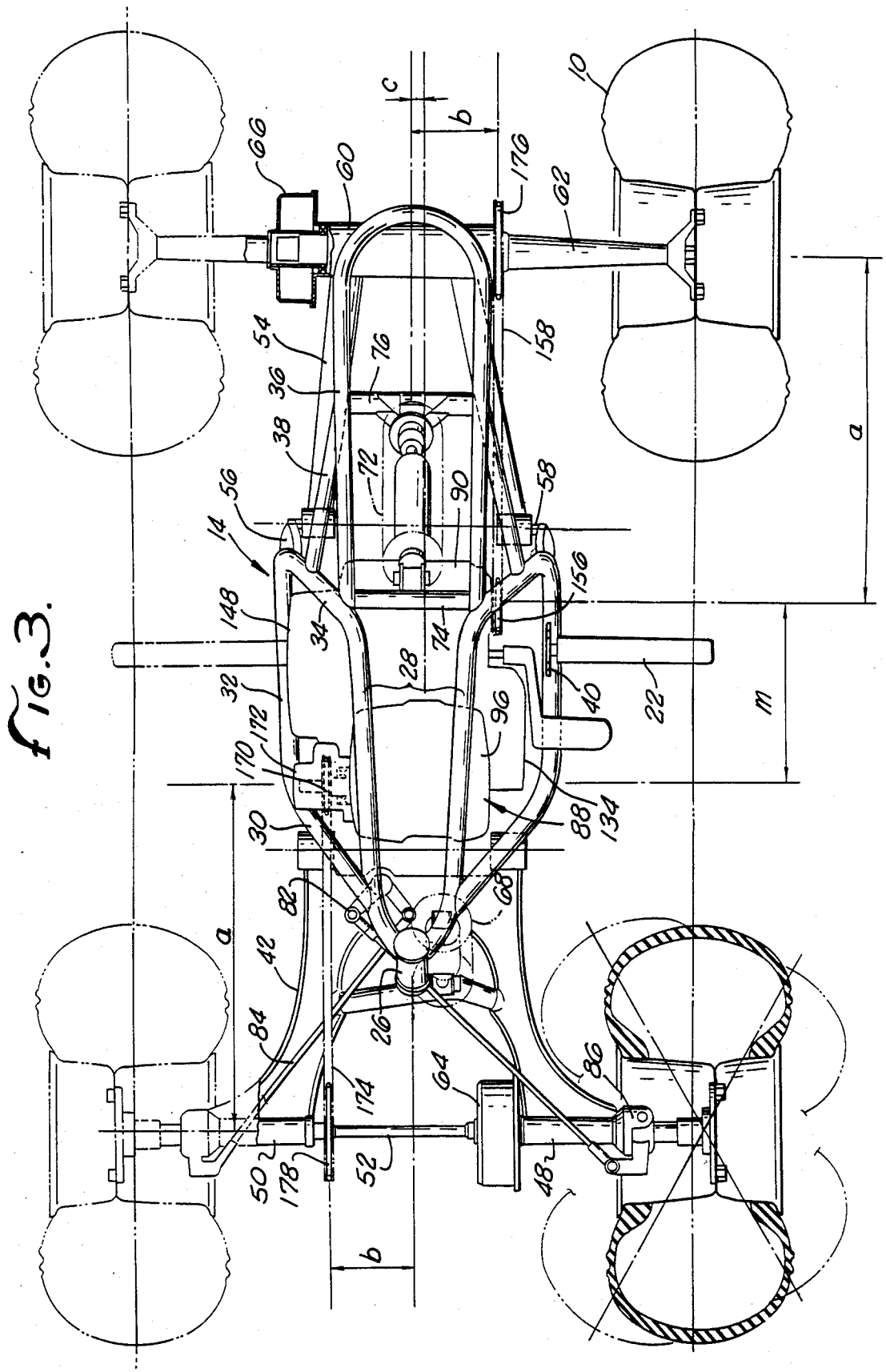
FIG. 3 is a plan view of the frame and power train of the embodiment of FIG. 2.
Figure 4:
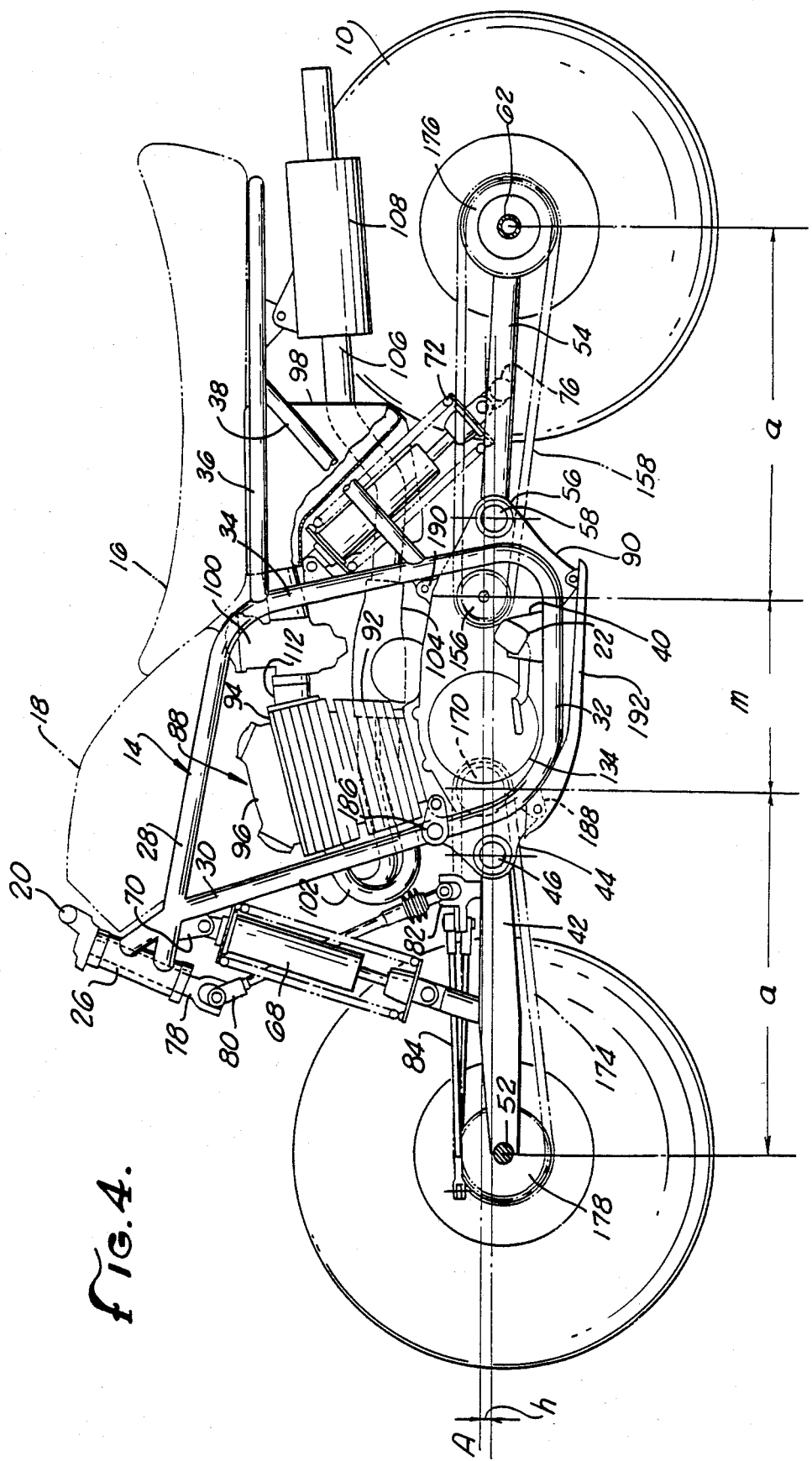
FIG. 4 is a side elevation of the embodiment of FIG. 2.

Looking in greater detail to the frame 14, FIGS. 2, 3 and 4 illustrate the frame structure of the first embodiment. A head pipe 26 is located forwardly of the main frame structure. The frame structure 14 includes main frame pipes 28 of which there are two. Down tubes 30 of which there are also two extend downwardly from the head pipe 26 and include rearward extensions 32. Center tubes 34 extend downwardly from the main frame pipes 28 to meet the rearward extensions 32 of the down tubes 30. The configuration of the frame is such that the rearward extensions 32 of the down tubes 30 are spaced wider than the main frame pipes 28 as can best be seen in FIG. 3. Extending rearwardly from the main frame body are seat rails 36 supported by rear stays 38. As noted above, the footpegs 22 are fixed to the frame 14 at two brackets 40 which are securely fixed to the rearward extensions 32 of the down tubes 30.

Associated with the frame 14 are front and rear suspension systems. A front swing arm 42 is pinned to two front brackets 44 located on the down tubes 30 by means of a front pivot shaft 46 extending between the brackets 44. The front swing arm 42 is shown to be symmetrical, extending in two swing arm elements with a cross-member 43 all of unitary construction. Two supporting journals 48 and 50 are arranged at the forward end of the front swing arm 42 to receive a drive axle shaft 52 for driving the front wheels 10. The bumper 24 is illustrated in FIG. 2 as being fixed to the front swing arm 42.

The rear suspension includes a rear swing arm 54 pivotally pinned to pivot brackets 56 by a rear pivot shaft 58. The rear swing arm 54 extends rearwardly to a supporting journal 60 which receives a rear drive axle shaft 62. Inboard front and rear brakes 64 and 66 include elements fixed to the swing arms 42 and 54, respectively, and drive axle shafts 52 and 62, respectively, employed in a conventional manner.

The front swing arm 42 is associated with a cushion assembly 68 extending from a pivot bracket 70 to the cross member 43. The axis of the cushion assembly 68 is conveniently displaced from the center line of the vehicle in order to accommodate the steering mechanism and to locate the upper bracket 70 at an appropriate location. A rear cushion assembly 72 is similarly associated with the rear swing arm 54. The rear cushion assembly 72 is conveniently oriented on the axis of the vehicle and extends between a cross member 74 of the frame 14 and a cross member 76 of the rear swing arm 54.

The steering linkage associated with the handlebar steering mechanism 20 extends through the head pipe 26 including a steering stem 78. The steering stem 78 is pivotally associated with a connecting rod 80 to transmit rotational position to a steering link 82 pivotally mounted to the front swing arm 42. The association of the connecting rod 80 with the steering link 82 and with the steering stem 78 are illustrated in greatest detail in FIG. 4 as including universal couplings. The steering link 82 is pivotally coupled with tie rods 84 which cross and extend to steering hubs 86 at the ends of the front axle shaft 52.

Figure 6:
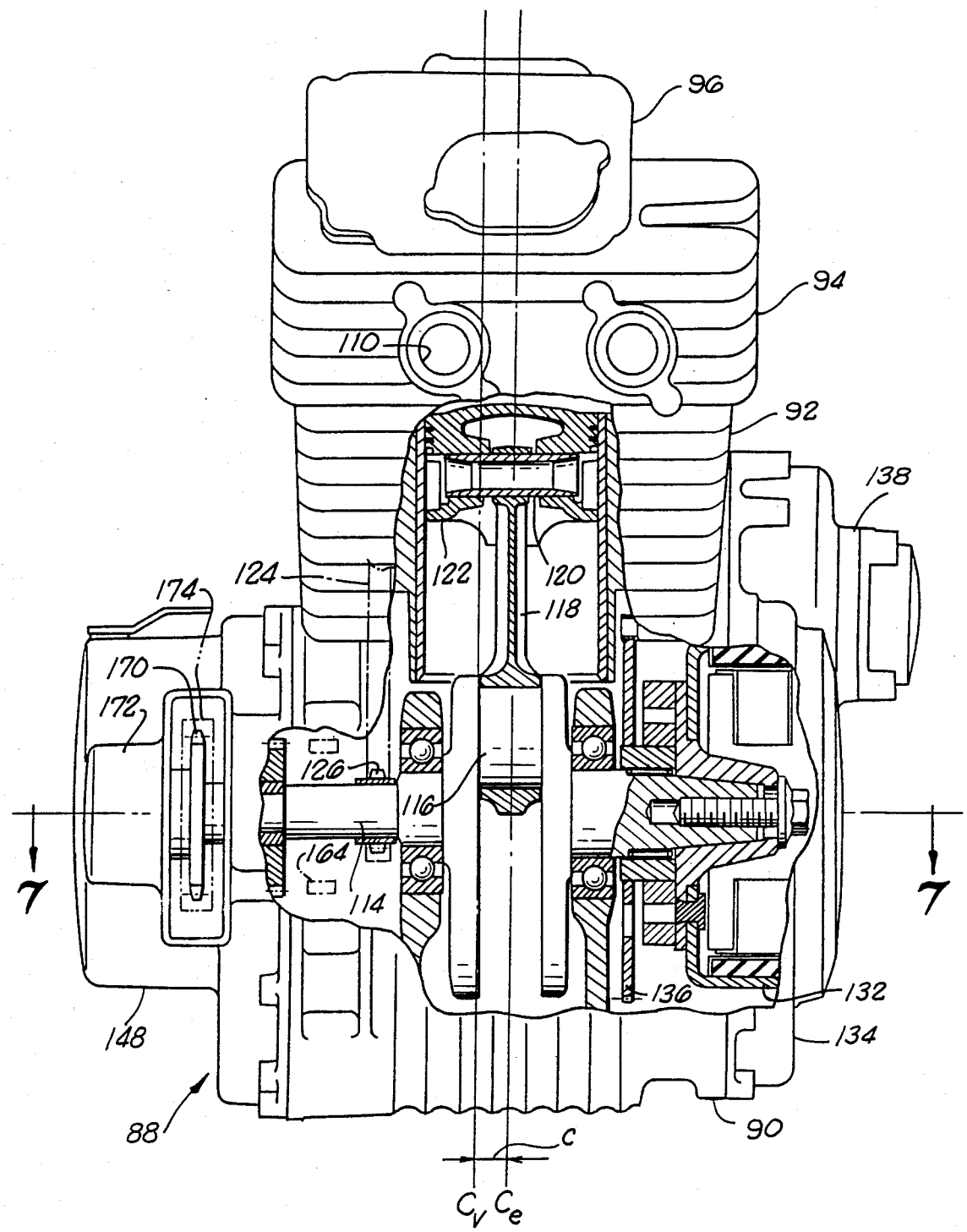
FIG. 6 is a front view of the engine of FIG. 5 with portions broken away for clarity.

Located centrally within the frame 14 and supported thereby is an engine and power output assembly, generally designated 88. The engine and power output assembly 88 generally includes an engine case 90, a cylinder block 92, a head 94 and a head cover 96. The engine intake system includes an air cleaner 98 and a carburetor 100. The exhaust system includes exhaust pipes 102, a manifold 104, a tail pipe 106 and a muffler 108. The exhaust pipes extend around one side of the engine and are held to one of the seat rails 36. Two exhaust ports 110 are illustrated in FIG. 6. The engine disclosed is a three valve engine having two exhaust ports 110 and a single intake 112.

The engine 88 includes the crankcase and transmission case as one structural unit. The engine case is divided at plane A into upper and lower portions. The cylinder block 92 extends from the upper portion of the engine case 90. The engine includes a crankshaft 114 which, in the embodiment of FIG. 2, extends transversely of the vehicle. Associated with the crankshaft 114 is a crankpin 116. A connecting rod 118 extends from the crankpin 116 into the cylinder block 92 and is connected by means of a wrist pin 120 to a piston 122. A timing chain 124 extends about a sprocket 126 on the crankshaft 114 and upwardly to a cam shaft sprocket 128 to drive a cam shaft 130.

Associated with a first end of the crankshaft 114 is an alternating current generator 132. A generator housing 134 extends over the generator 132. Within the cavity of the alternating current generator 132 is a gear 136 which is driven by a starter motor 138 through an idler gear 140.

From the other end of the crankshaft 114, a first reduction gear 142 drives a second reduction gear 144 which in turn drives a clutch assembly 146. The clutch assembly 146 may be manually actuated in a conventional manner. Surrounding the end of the crankshaft and the clutch assembly 146 is a clutch cover 148.

Driven by the clutch assembly 146 when engaged is a first transmission shaft 150. The first transmission shaft 150 is associated with a speed change transmission 152 which cooperates to provide varying output ratios to a second transmission shaft 154. The second transmission shaft 154 also is an output shaft. The output shaft 154, the first transmission shaft 150 and the crankshaft 114 are aligned in parallel in the plane A. Conveniently for fabrication of the bearing seats, the plane of the shaft is also the part line for the upper and lower portions of the engine case 90.

The output shaft 154 extends outwardly from the engine case 90 to one side of the generator cover 134. At this external location, a drive sprocket 156 engages a drive chain 158 as part of a power transmission means to the rear axle shaft 62. Thus, power is directed from the engine through the crankshaft 114, the clutch assembly 146, the first transmission shaft 150, the speed change transmission 152, the output shaft 154, the drive sprocket 156 and the drive chain 158 to the rear wheels.

Figure 7:
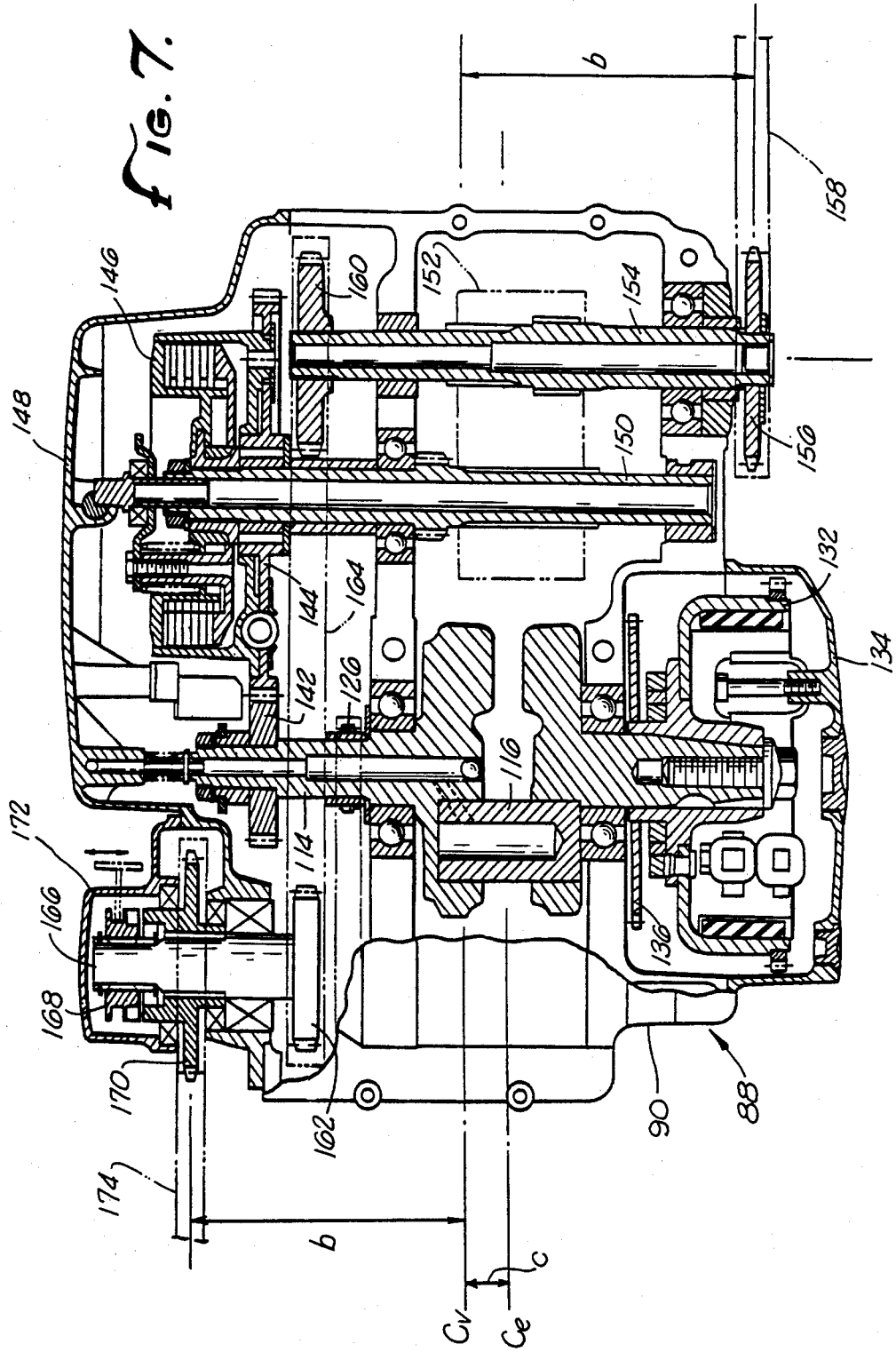
FIG. 7 is a cross-sectional plan view through line 7—7 of FIG. 6.

To provide power to the front wheels, the output shaft 154 includes a power transmission sprocket 160. A driven sprocket 162 located at the opposite side of the engine from the power transmission sprocket 160 is coupled thereto by means of a power transmission chain 164. An output shaft 166 extends outwardly from the engine case 90 on the opposite side of the engine from the drive sprocket 156. This output shaft 166 may be manually coupled by means of an engagement mechanism 168 to a drive sprocket 170. A cover 172 surrounds the engagement mechanism 168. The drive sprocket 170 is located to one side of the clutch cover 148 and, as illustrated in FIG. 7, extends no further out than the clutch cover 148. The drive sprocket provides power to a drive chain 174 providing a power transmission means to the front drive axle shaft 52.

The orientation of the power train is conveniently arranged for appropriate weight distribution and location of the various components. The engine has a center line $C_e$ displaced from the center line $C_v$ of the vehicle by a small distance c as best illustrated in FIGS. 6 and 7. The offset c conveniently allows for additional space for the exhaust pipes to circumvent the cylinder block 92. The power transmission means including the drive sprockets 156 and 170, the drive chains 158 and 174 and driven sprockets 176 and 178 associated with the drive axle shafts 62 and 52, respectively, are arranged to have the same length a between sprockets for both the front and rear power transmission means and are both offset an equal distance b from the center line of the vehicle. The sprockets 156 and 170 are illustrated as being offset longitudinally of the vehicle by a distance m. As seen in FIG. 4, the plane of the driving shafts of the engine is located above the plane of the pivot shafts 46 and 58 by a distance h.

Figure 5:
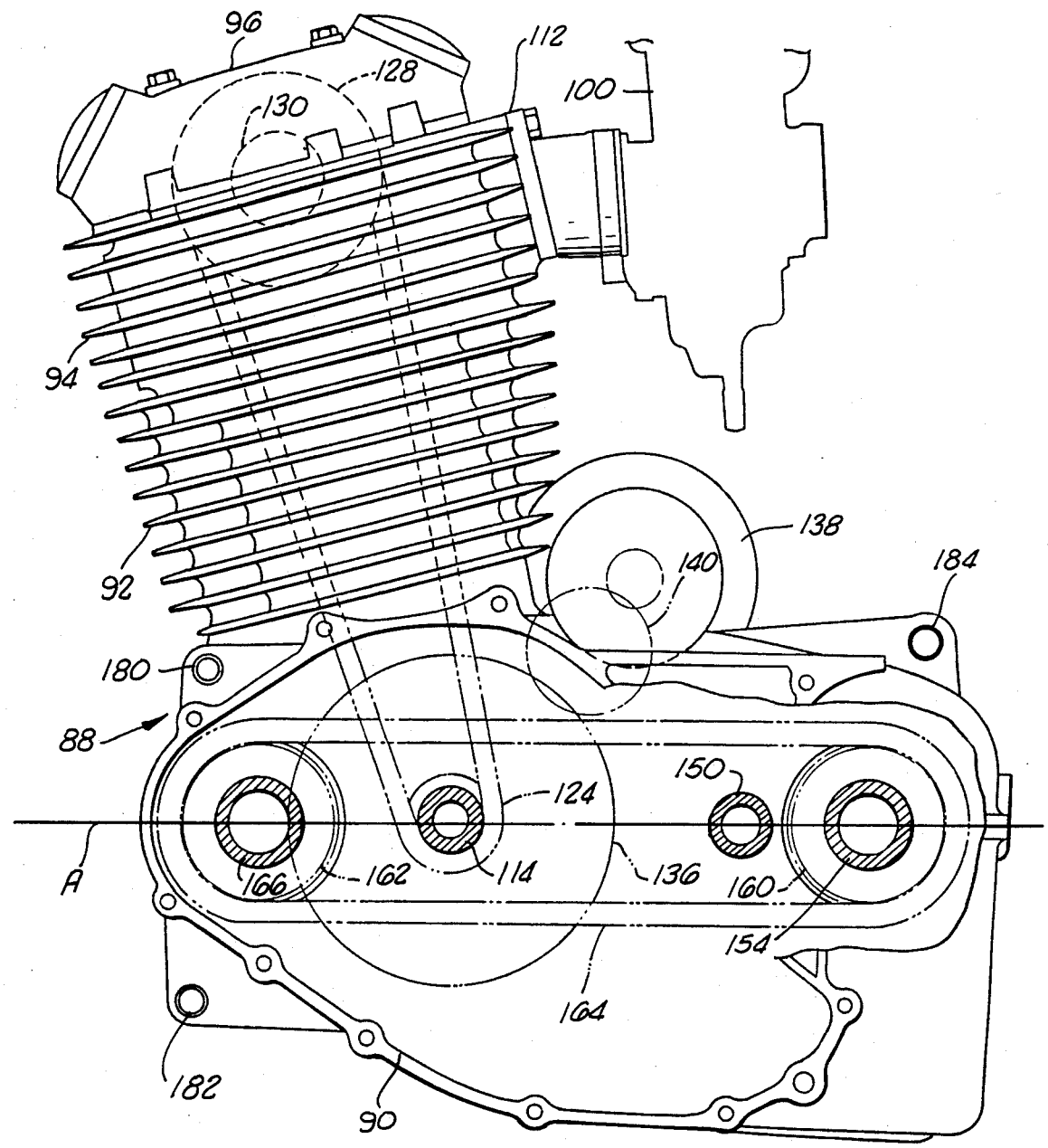
FIG. 5 is a detail side elevation of the engine and engine case of the embodiment of FIG. 2 illustrating the drive arrangement between two output shafts.

To mount the engine and power output assembly 88 to the frame 14, mounting brackets 180 and 182 are formed on the engine case as best seen in FIG. 5. A sleeve mounting bracket 184 is also located on the engine case. Looking to FIG. 4, the mounting brackets 180, 182 and 184 are associated with the frame through brackets 186, 188 and 190 on the frame, respectively. An underguard 192 is rigidly fixed beneath the engine case 90 to protect the underside of the engine.

Figure 8:
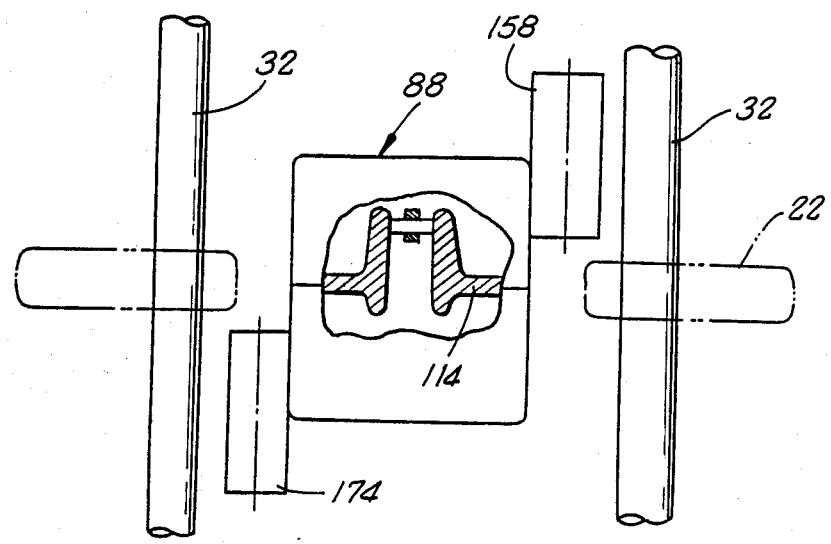
FIG. 8 is a schematic illustration of the power train arrangement of the embodiment of FIG. 2.
Figure 9:
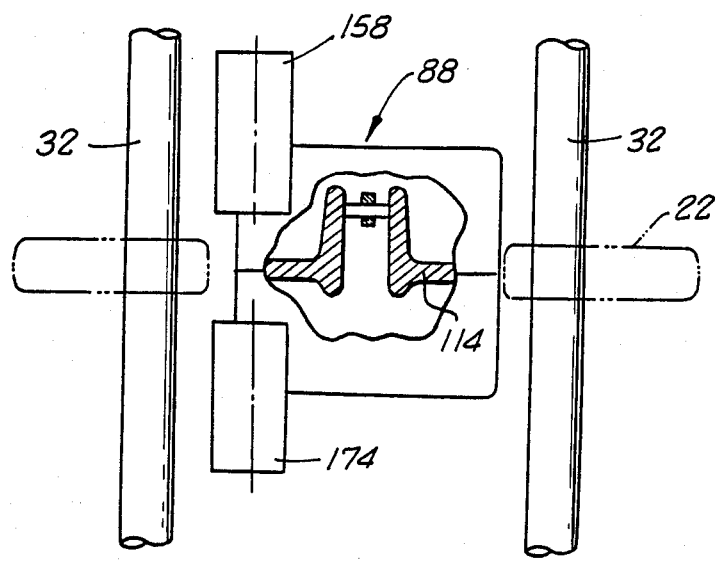
FIG. 9 is a schematic illustration of an alternate layout to that of FIG. 8.

The layout of the power train illustrated in FIGS. 2 through 7 is schematically illustrated in FIG. 8. As an alternate form of this embodiment, FIG. 9 schematically illustrates the location of the power transmission means on the same side of the engine 88. In spite of this location, the footpegs 22 are not constrained from being properly placed as can be seen in the schematic.

Figure 10:
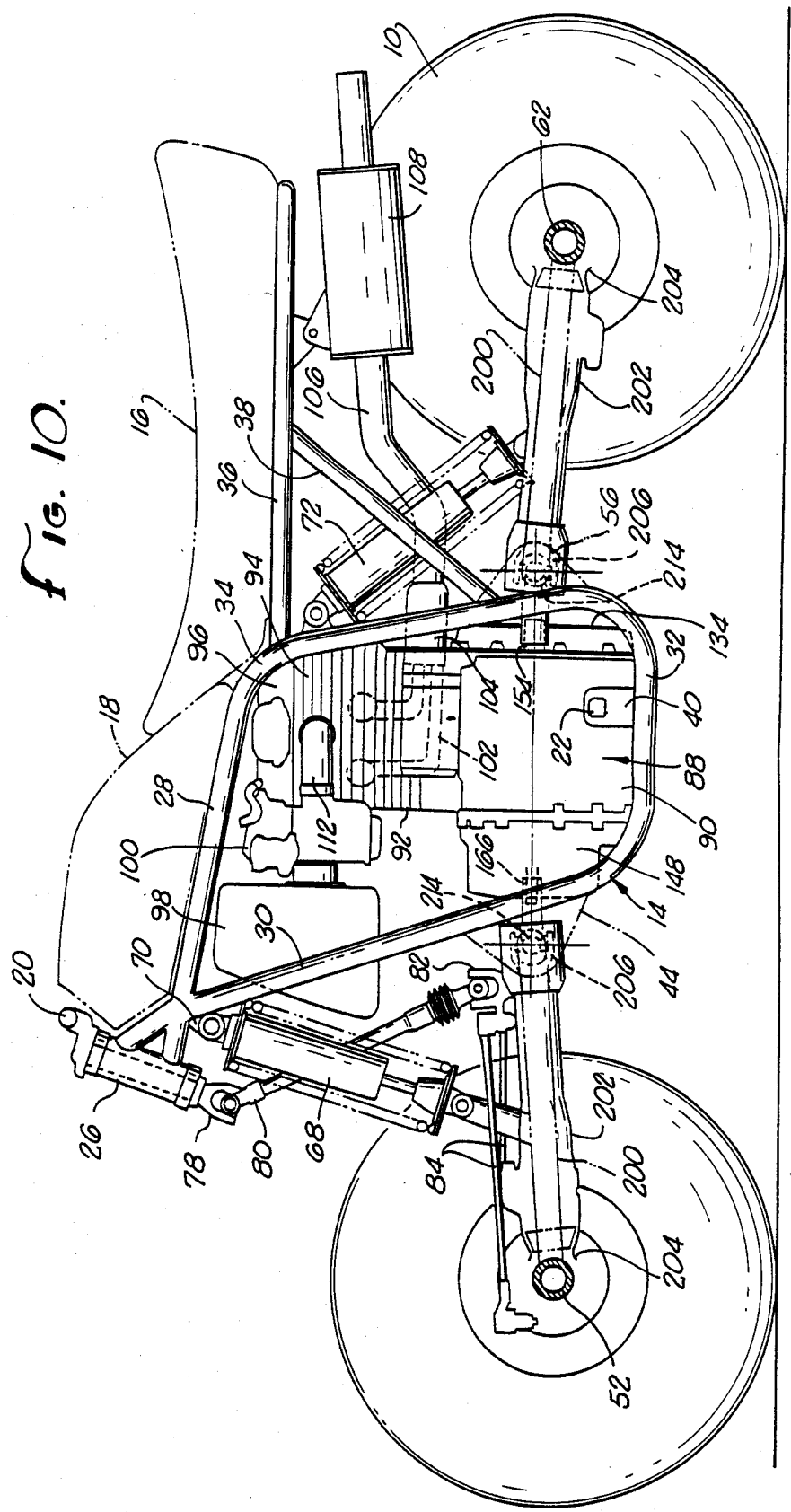
FIG. 10 is a cross-sectional elevation of a second embodiment of the present invention illustrating a shaft drive configuration.
Figure 11:
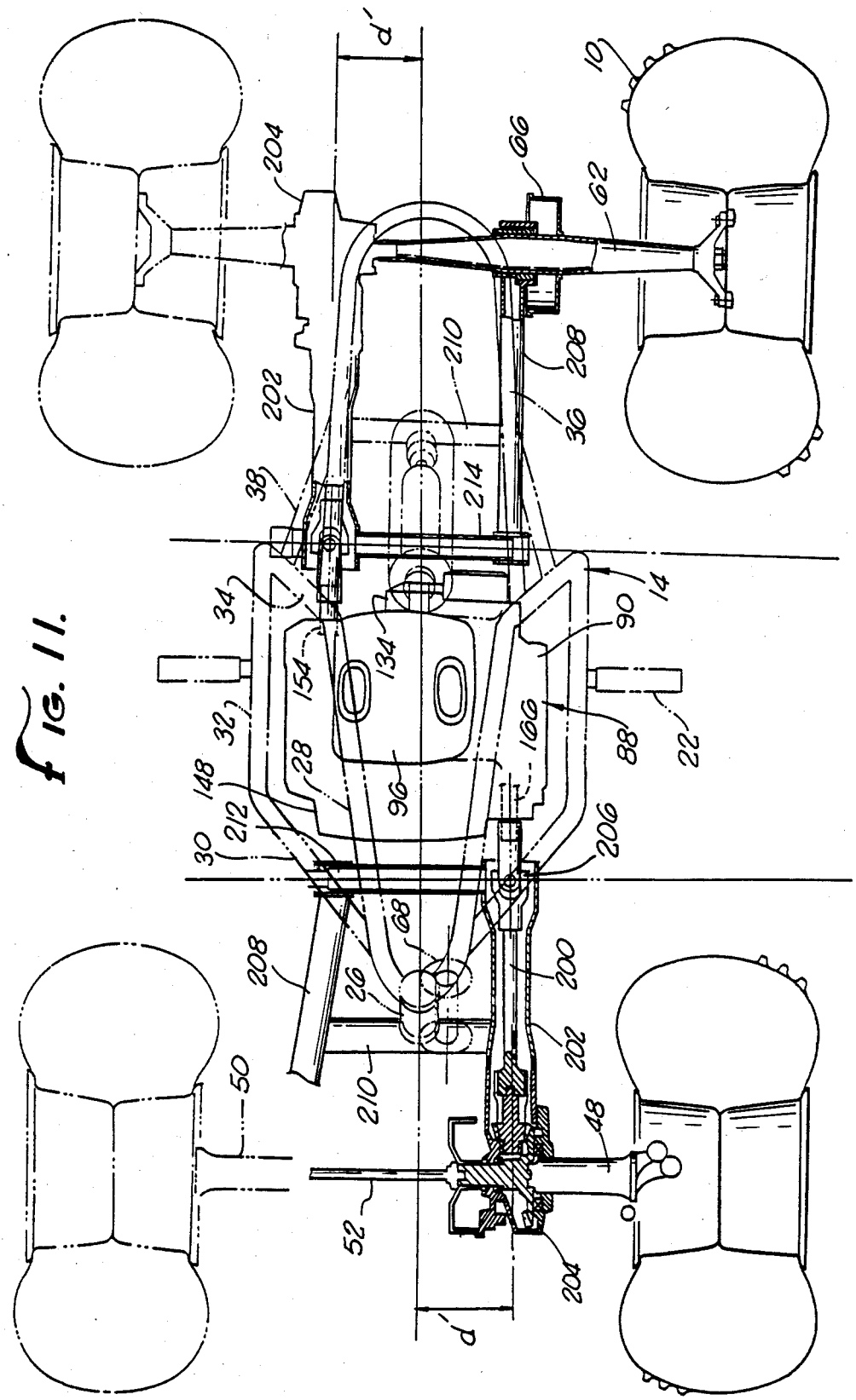
FIG. 11 is a plan view of the frame and power train of the embodiment of FIG. 10.

Turning next to the embodiment of FIGS. 10 through 15, identical reference numerals are employed where identical or equivalent components are illustrated. The embodiment of FIG. 10 is chiefly distinguished from that of FIG. 2 by the employment of shaft drives, the orientation of the engine with the crankshaft extending longitudinally of the vehicle and the orientation of the cylinder block relative to the engine case. Features having substantial similarity to the foregoing embodiment of FIG. 2 are not specifically discussed with reference to the embodiment of FIG. 10. Thus, the foregoing discussion is incorporated with reference to this second embodiment.

As stated above, a first distinction over the prior embodiment is the orientation of the engine and power output assembly 88 with the crankshaft 114 extending longitudinally of the vehicle. The output shafts 154 and 166 similarly extend fore and aft parallel to the crankshaft 114. This orientation of the engine 88 is preferable for coupling with a power transmission means incorporating drive shafts. The output shafts 154 and 166 remain accessible from opposite sides of the engine and are equally displaced from the center line by a distance d'. The location of the output shafts 154 and 166 allow the engine to be of minimum dimension and avoid complication associated with gearing necessary to circumvent the clutch assembly.

The power transmission means deriving power from the output shafts 154 and 166 include enclosed drive shafts of substantially identical design. The drive shafts 200 are contained within housings 202 forming part of the swing arms. A gear box 204 is positioned about each axle 52 and 62 and includes beveled gearing. At the other end of each drive shaft 200 is a universal joint 206 to allow flexure of the drive line.

The front and rear swing arms include the housings 202 and a spaced member 208. A cross member 210 adds rigidity to the system and provides for attachment of the cushion assemblies 68 and 72. The swing arms thus formed are pivotally mounted about pivot shafts 212 and 214. The universal joint 206 associated with each drive shaft 200 is located on the axis of the pivot shafts 212 and 214 for optimized performance.

As stated above, the cylinder block of the second embodiment is oriented relative to the engine case in a manner not described with the first embodiment. The cylinder block 92 is shown to be at an angle B relative to the center line of the engine case 90. The cylinder block 92 extends outwardly from the engine case 90 as can best be seen in FIG. 12 and is angled or inclined toward the portion of the engine case 90 containing the speed change transmission. Normally, engines having an integral crank case and transmission case are oriented with the cylinder blocks inclined away from the speed change transmission. However, by the present orientation, the cylinder block 92, the cylinder head 94 and the head cover 96 do not extend laterally beyond the extension case 90. Additionally, the carburetor 100 and exhaust pipes 102 similarly do not extend laterally beyond the engine case 90.

Figure 12:
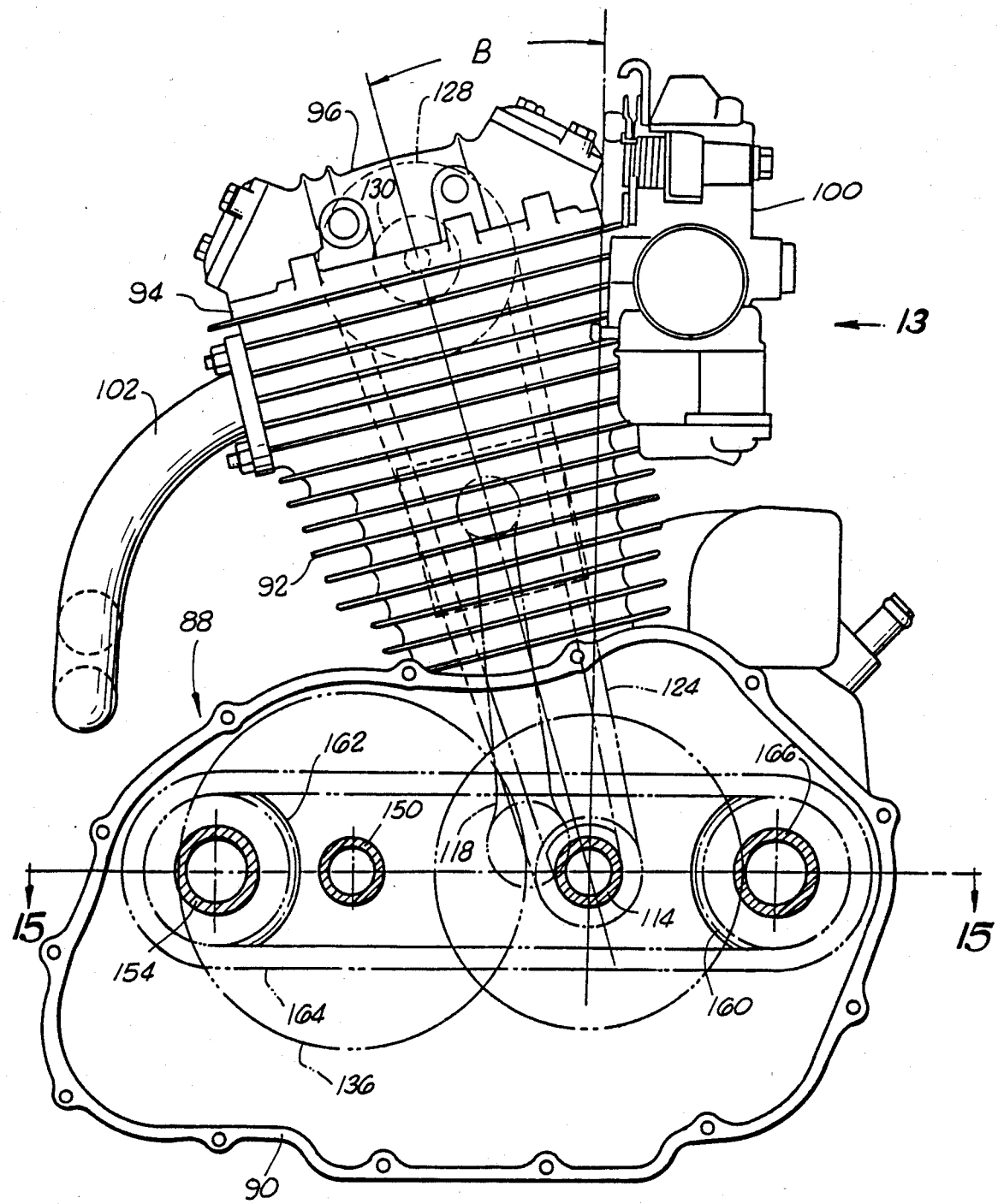
FIG. 12 is a front elevation of an engine of the embodiment of FIG. 10.
Figure 13:
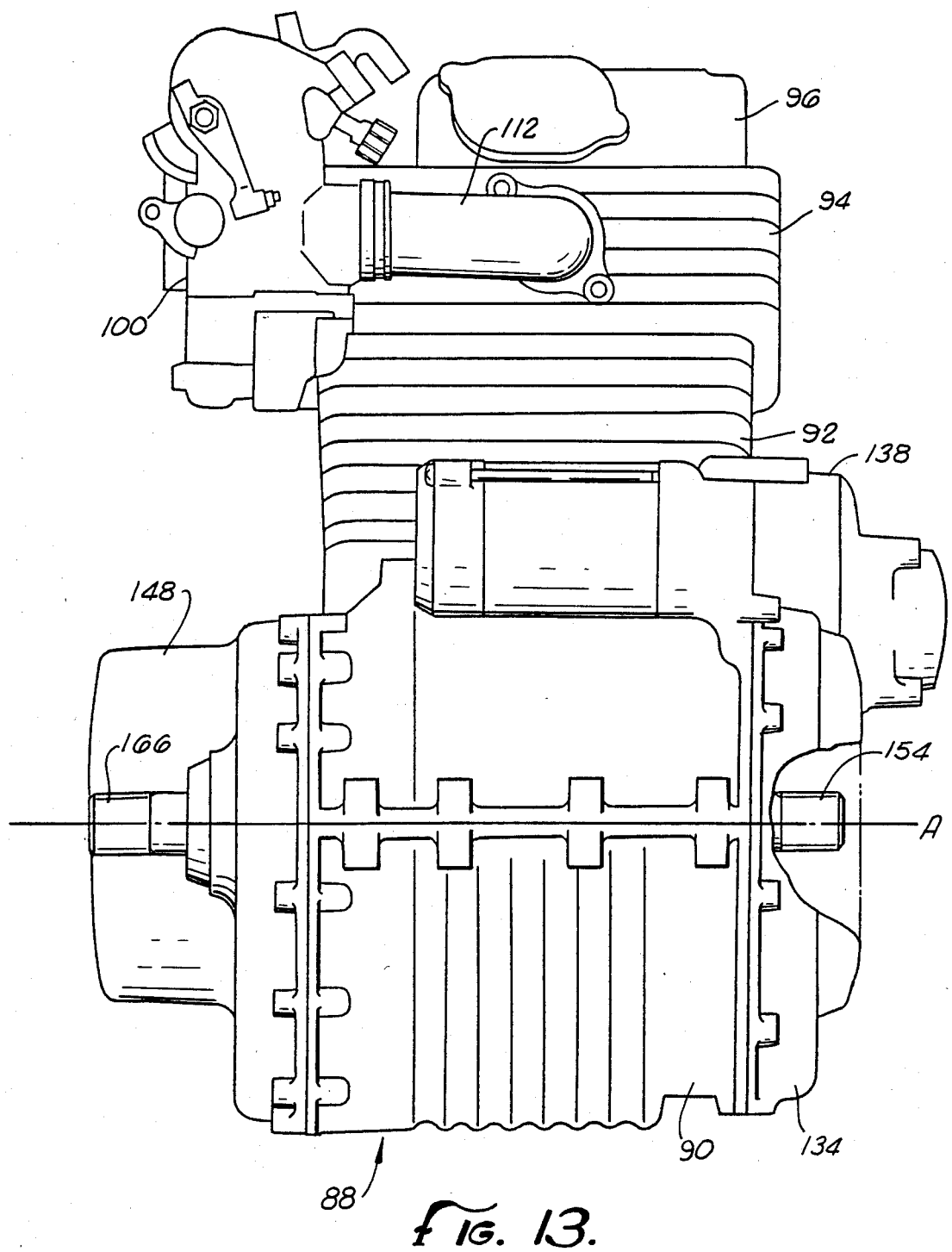
FIG. 13 is a side elevation of the engine of FIG. 12 looking in the direction of arrow 13.
Figure 14:
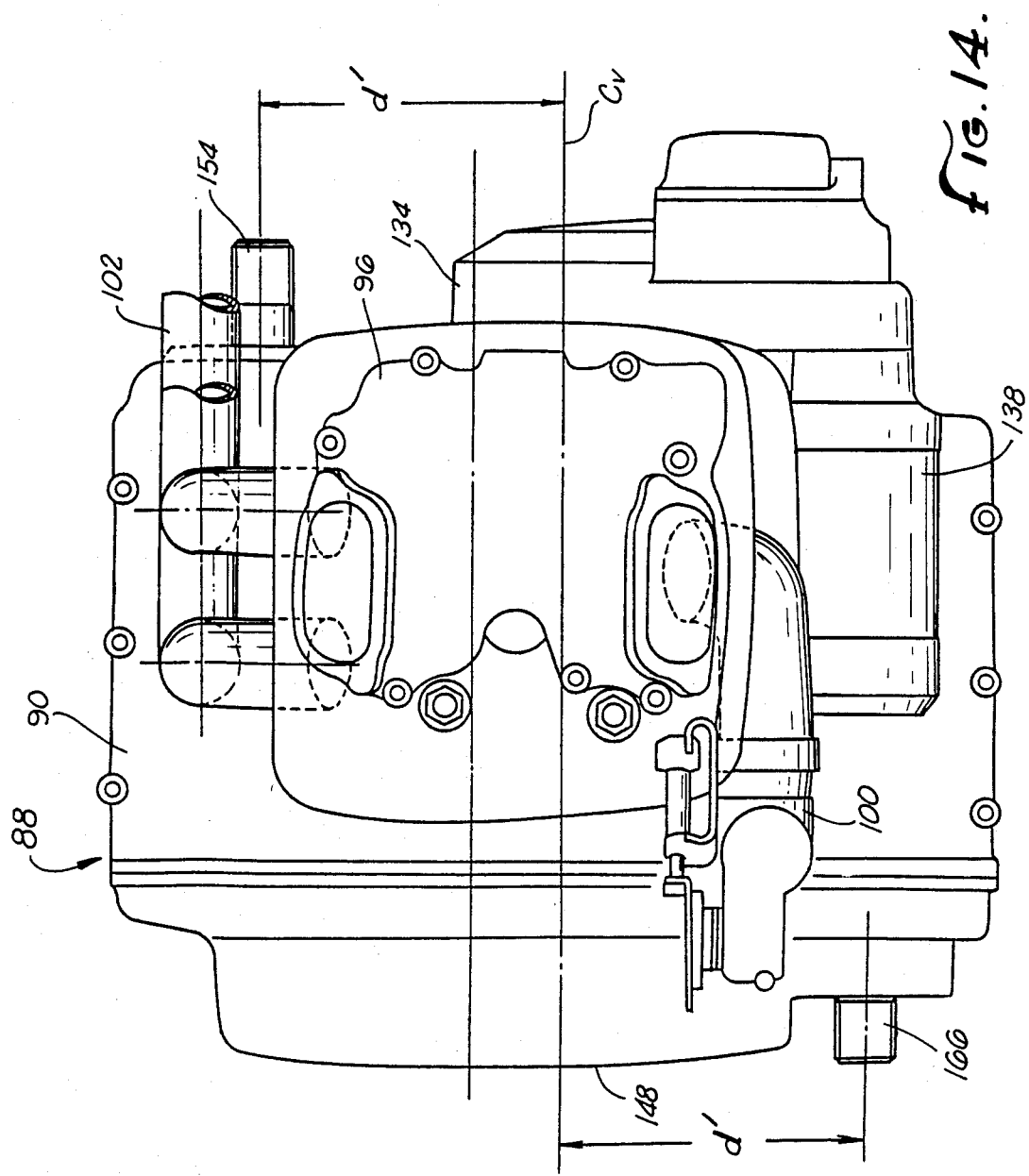
FIG. 14 is a plan view of the engine of FIG. 12.
Figure 15:
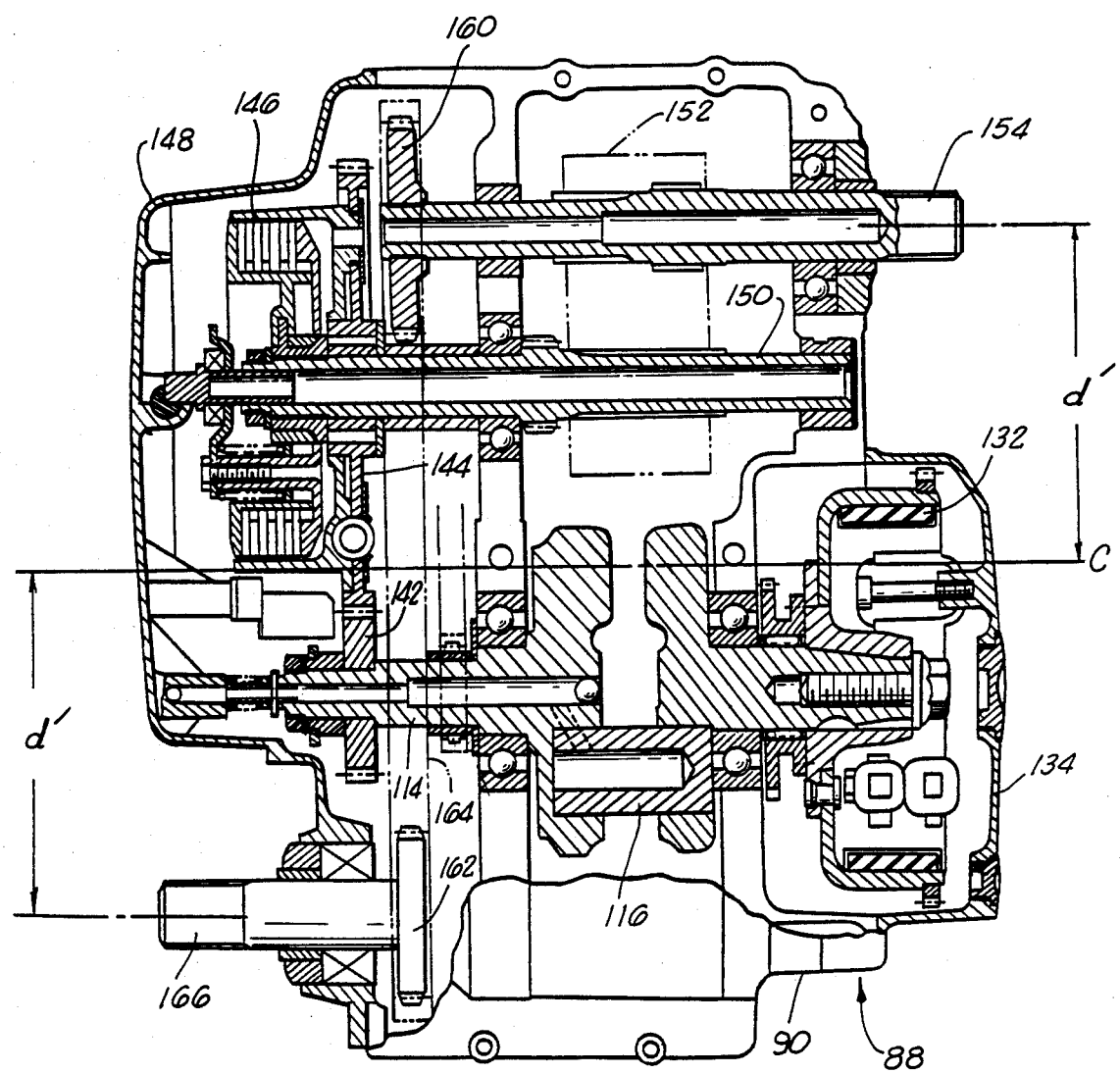
FIG. 15 is a cross-sectional plan view taken along line 15—15 of FIG. 12.
Figure 16:
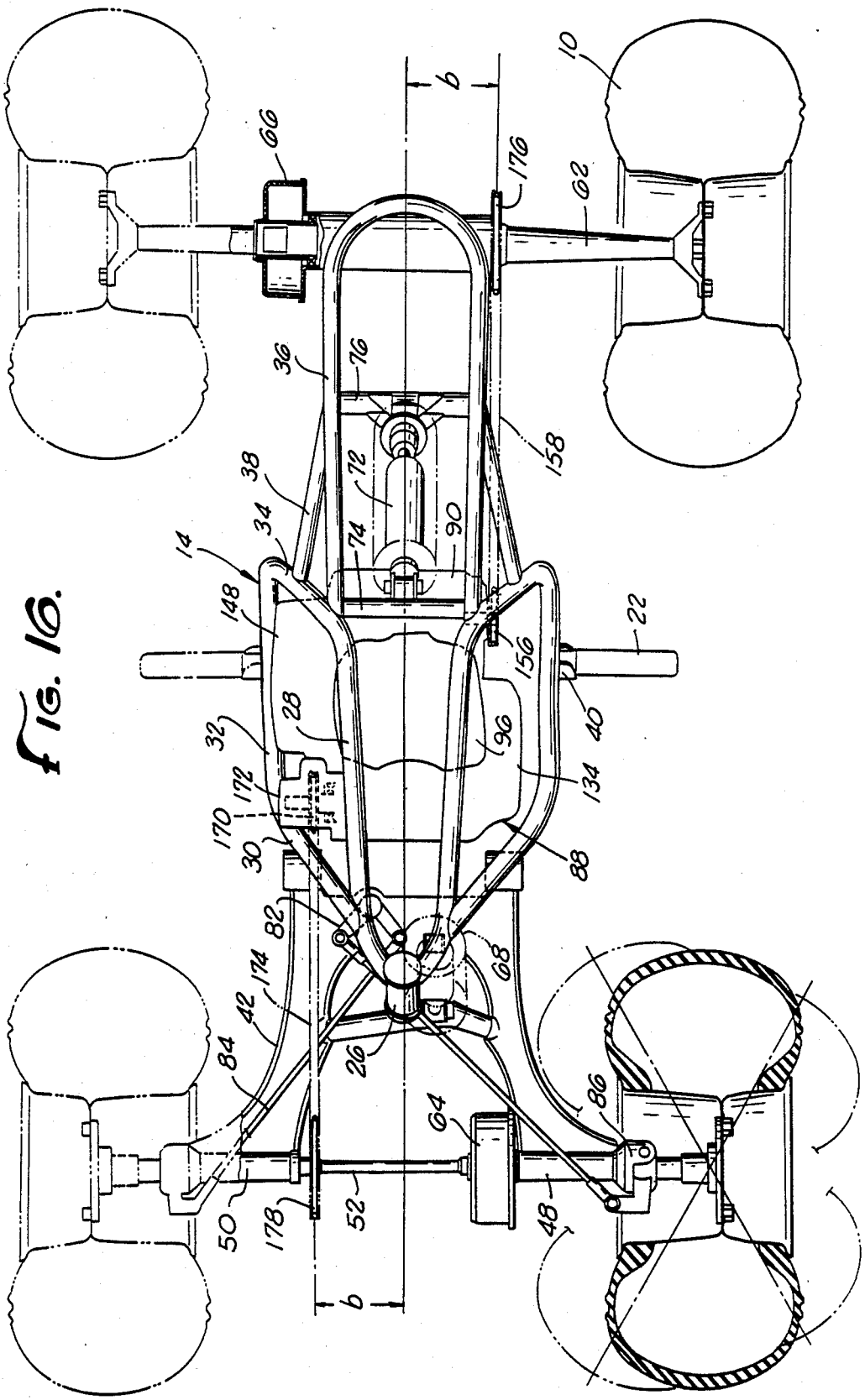
FIG. 16 is a third embodiment of the present invention illustrated in plan view with the engine generally of FIG. 12 and a chain drive mechanism.
Figure 17:
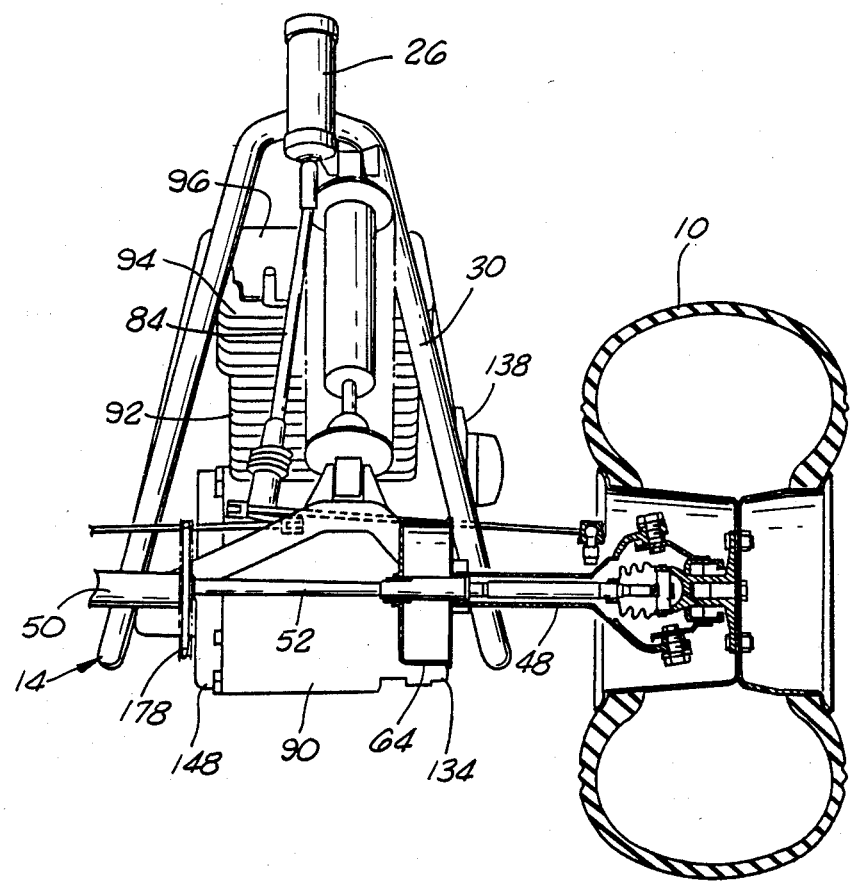
FIG. 17 is a front view of the power train of FIG. 16.

Lastly, the embodiments of FIGS. 16 and 17 illustrate the engine of FIG. 12 as employed with a chain drive arrangement. Once again, the reference numerals are identical to those depicting identical or equivalent elements in the prior embodiment. To accommodate the chain drive power transmission means, the engine is oriented with the crankshaft transverse to the vehicle. The advantageous orientation of the cylinder block 92 provides further freedom in the location of the engine and power output assembly.

Thus, a plurality of embodiments for power train arrangements have been illustrated which employ a minimum of space to properly accommodate additional features of a vehicle having front and rear wheel drive. While embodiments and applications of this invention have been shown and described, it would be apparent to those skilled in the art that many more modifications are possible without departing fro the inventive concepts herein. The invention, therefore, is not to be restricted except in the spirit of the appended claims.

What is claimed is:

1. A power train for a front and rear wheel drive vehicle comprising
   an engine having a crankshaft and an engine case;
   a first output shaft on a first side of said crankshaft and parallel thereto in said engine case;
   a second output shaft on a second side of said crankshaft and parallel thereto in said engine case; and
   a speed change transmission coupled between said crankshaft and said second output shaft, said first output shaft being driven by said second output shaft.

2. The power train of claim 1 wherein said speed change transmission is positioned in said engine case.

3. The power train of claim 1 wherein said speed change transmission includes a first transmission shaft, said first transmission shaft being between said crankshaft and said second output shaft.

4. The power train of claim 3 wherein said engine further has a cylinder block extending from said engine case and being inclined toward said second output shaft.

5. The power train of claim 1 further comprising a drive chain and sprockets on said first and second output shafts.

6. The power train of claim 1 further comprising an electrical generator and a power train clutch, said generator being located at one end of said crankshaft and said clutch being coupled with the other end of said crankshaft, said first output shaft being adjacent one of said generator and said clutch and said second output shaft being adjacent the other of said generator and said clutch.

7. A power train for a front and rear wheel drive vehicle, comprising
   an engine having a crankshaft;
   a first output shaft on one side of said crankshaft and parallel thereto;
   a second output shaft on the other side of said crankshaft from said first output shaft and parallel thereto;
   power transmission means for transmitting power from said first output shaft and said second output shaft to the vehicle wheels for front and rear wheel drive; and
   a speed change transmission coupled between said crankshaft and said second output shaft, said first output shaft being driven by said second output shaft.

8. A power train for a front and rear wheel drive vehicle, comprising
   an engine having a crankshaft;
   a first output shaft on one side of said crankshaft and parallel thereto;
   a second output shaft on the other side of said crankshaft from said first output shaft and parallel thereto;
   power transmission means for transmitting power from said first output shaft and said second output shaft to the vehicle wheels for front and rear wheel drive;
   power transmission means for transmitting power from said crankshaft to each of said first and second output shafts; and
   an electrical generator and a power train clutch, said generator being located at one end of said crankshaft and said clutch being coupled with the other end of said crankshaft, said first output shaft being adjacent one of said generator and said clutch and said second output shaft being adjacent the other of said generator and said clutch.

9. A front and rear drive vehicle comprising
   a frame;
   an engine having a crankshaft, an engine case and a cylinder block, said engine being positioned in said frame;
   a speed change transmission within said engine case;
   a first output shaft in said engine case on one side and parallel to said crankshaft;
   a second output shaft in said engine case on the other side of said crankshaft from said first output shaft and parallel thereto;
   power transmission means for transmitting power from said first and second output shafts to the vehicle wheels;
   a seat on said frame;
   footpegs on said frame, said engine beneath said seat and between said footpegs; and
   a sprocket on each of said first and second output shafts and a drive chain, said drive chain extending between said sprocket on said first output shaft and said sprocket on said second output shaft.

10. A front and rear drive vehicle comprising a frame;
    an engine having a crankshaft, an engine case and a cylinder block, said engine being positioned in said frame;
    a speed change transmission within said engine case;
    a first output shaft in said engine case on one side and parallel to said crankshaft;
    a second output shaft in said engine case on the other side of said crankshaft from said first output shaft and parallel thereto;
    power transmission means for transmitting power from said first and second output shafts to the vehicle wheels;
    a seat on said frame;
    footpegs on said frame, said engine beneath said seat and between said footpegs;
    an electrical generator located at one end of said crankshaft; and
    a power train clutch coupled with the other end of said crankshaft, said first output shaft being adjacent one of said generator and said clutch and said second output shaft being adjacent the other of said generator and said clutch.

* * * * *